June 15, 1971  R. A. SEDERQUIST ET AL  3,585,078
METHOD OF REFORMER FUEL FLOW CONTROL
Filed Nov. 19, 1968  2 Sheets-Sheet 1
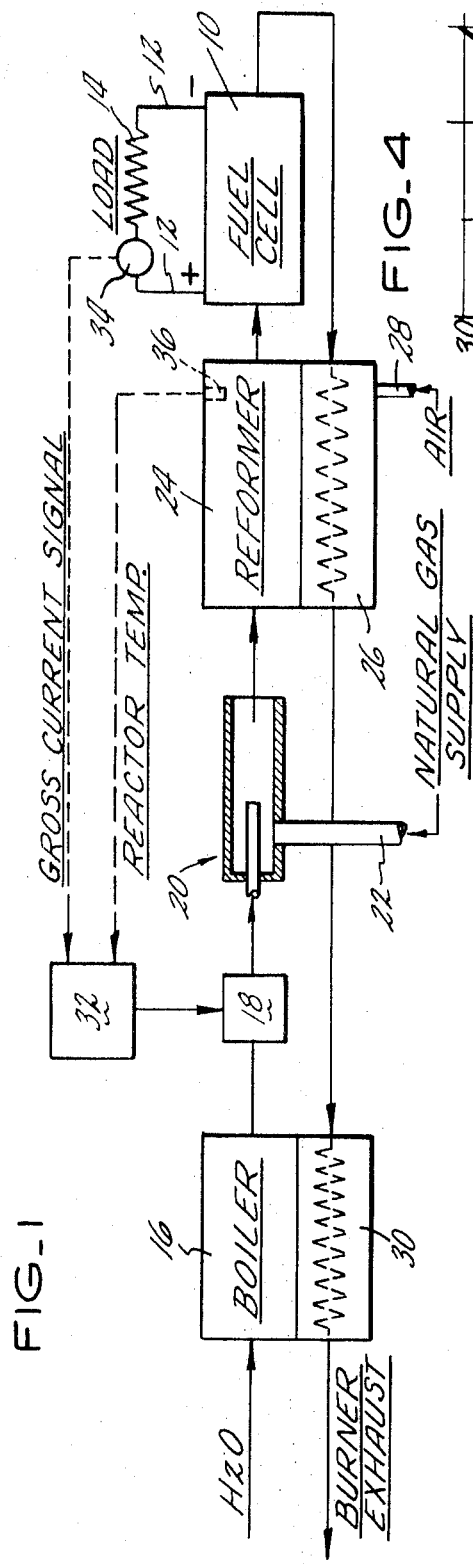
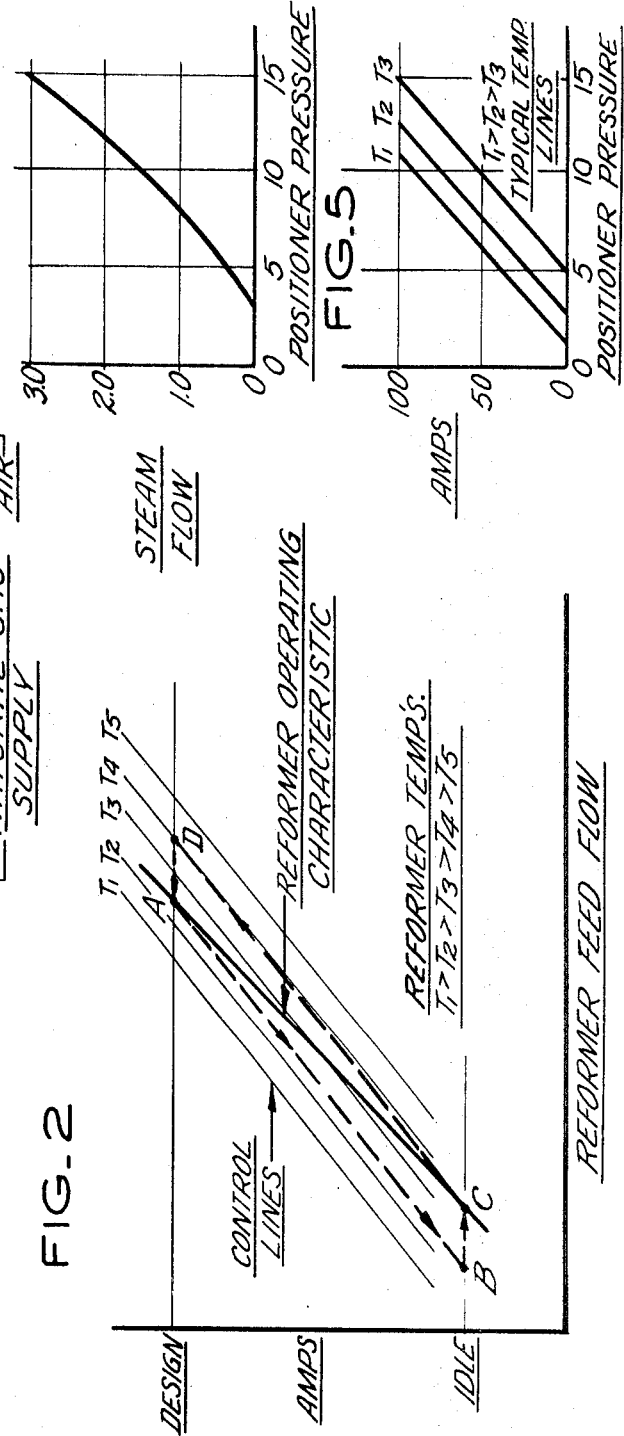
INVENTORS
RICHARD A. SEDERQUIST
JOHN W. LANE
BY Edmund C. Meisinger
ATTORNEY United States Patent Office 3,585,078
Patented June 15, 1971

3,585,078
METHOD OF REFORMER FUEL FLOW CONTROL
Richard A. Sederquist, Newington, and John W. Lane, East Hampton, Conn., assignors to United Aircraft Corporation, East Hartford, Conn.
Filed Nov. 19, 1968, Ser. No. 776,955
Int. Cl. H01m 27/00
U.S. Cl. 136—86         5 Claims

ABSTRACT OF THE DISCLOSURE

A fuel cell control is disclosed wherein the method of regulating the reformer feed flow is responsive to the hydrogen consumption demands of the fuel cell. The basic mode of operation concerns the control of reformer feed flow as a function of fuel cell gross current and biasing the feed flow as a function of reformer temperature. Flow settings are achieved rapidly through gross current control and the reactor temperature provides trimming of the flow settings.

BACKGROUND OF THE INVENTION

This invention relates to a method of controlling the fuel flow for use in fuel cell systems. In particular, this invention pertains to the method of controlling the feed flow to a reformer as a function of the fuel cell gross current and the reformer temperature.

A fuel cell is a device which directly converts chemical energy into electrical energy. In a fuel cell, normally a fuel and air are supplied to spaced electron conductors identified as electrodes where the release and acceptance of electrons occurs. An ion transfer medium which is capable of conducting an electrical charge separates the electrodes. On the fuel side of the cell, the hydrogen diffuses through the electrode and hydrogen atoms are absorbed on the surface of the electrode in the form of atoms. These atoms typically react with the ion transfer medium to form water and, in the process, give up electrons to the electrode. The electrons flow through an external circuit to the oxidant electrode and constitute the electrical output of the cell. The electron flow supports the oxidant half of the reaction. At the air side of the cell, oxygen diffuses through the electrode and is adsorbed on the electrode surface. The adsorbed oxygen and the inflowing electrons combine with the water in the ion transfer medium to form ions which complete the circuit by migrating through the ion transfer medium to the fuel electrode.

If the external circuit is open, the fuel electrode accumulates a surface layer of negative charges and the oxidant electrode similarly accumulates a layer of positive charges. The presence of the accumulated electrical charges provides the potential that forces electrons through the external circuit when the circuit is closed. As the circuit is closed, the fuel cell being a demand system, the reactions will proceed at a moderate rate and the accumulated charges will be used at a moderate rate. It is evident that fuel and air must be supplied to the respective electrodes so that current can be continually supplied to a load in the external circuit.

To produce economical power on a large scale, fuel cells must utilize inexpensive fuels. Often the fuel is steam reformed to produce hydrogen in a package outside the fuel cell called the reformer.

Fuel cell systems have maintained the desired cell output by maintaining the operating temperature of the fuel cell since the cell performance is a function of the temperature. It is also known to monitor reactant pressures, humidity levels, electrolyte concentration, flow rates, and a host of other parameters to keep the system operating under optimum conditions.

SUMMARY OF THE INVENTION

It is an object of this invention to provide a novel method of controlling the fuel feed to a fuel cell.

Another object of this invention is to provide a method of controlling a fuel cell system so that the reformer is responsive to the hydrogen consumption demands of the fuel cell and positive control is maintained over the fuel cell hydrogen utilization and the reformer reactor temperature.

A feature of this invention is the combination of regulating the feed flow to the reformer as a function of the fuel cell gross current and biasing the reformer feed flow as a function of reactor temperature. Another aspect of this invention is the controlling of the reformer steam flow thereby regulating the fuel flow to the reformer.

It has now been found that the foregoing and related objects and advantages may be readily attained in a novel method of controlling a fuel cell system. In accordance with the invention, the fuel cell gross current and the reformer operating temperature are sensed and are utilized to regulate the reformer feed flow. The initial feed supply setting depends upon the gross current and reactor temperature provides the final adjustment.

In operation, steam is provided as the primary flow to a variable area ejector where a gaseous fuel supply is the secondary flow. Steam flow is regulated depending upon the gross current and reactor temperature. As steam flow increases the secondary flow of fuel increases. These streams mix and are supplied to a catalytic reformer where the feed is steam reformed. Thereafter, this mixture can be supplied to the fuel cell for the electrochemical reaction or the hydrogen may be separated for ultimate use in the fuel cell.

An apparatus for reformer fuel flow control is described and claimed in the copending application of Elliot 1. Waldman, Ser. No. 776,954, filed on the same day as this application and assigned to the same assignee. FIG. 2 of this application is presented herein to show an embodiment capable of carrying out our method of reformer fuel flow control.

BRIEF DESCRIPTION OF THE DRAWINGS

FIG. 1 is a diagrammatic view of a fuel cell system utilizing the method of control of the present invention.

FIG. 2 is a graphical presentation of the effect of gross current and reactor temperature on reformer feed flow.

FIG. 4 is a graphical presentation of steam flow depending on the variable ejector stroke.

FIG. 5 is a graphical presentation of the effect of current and temperature on the positioner supply pressure.

DESCRIPTION OF THE PREFERRED EMBODIMENT

Figure 3:
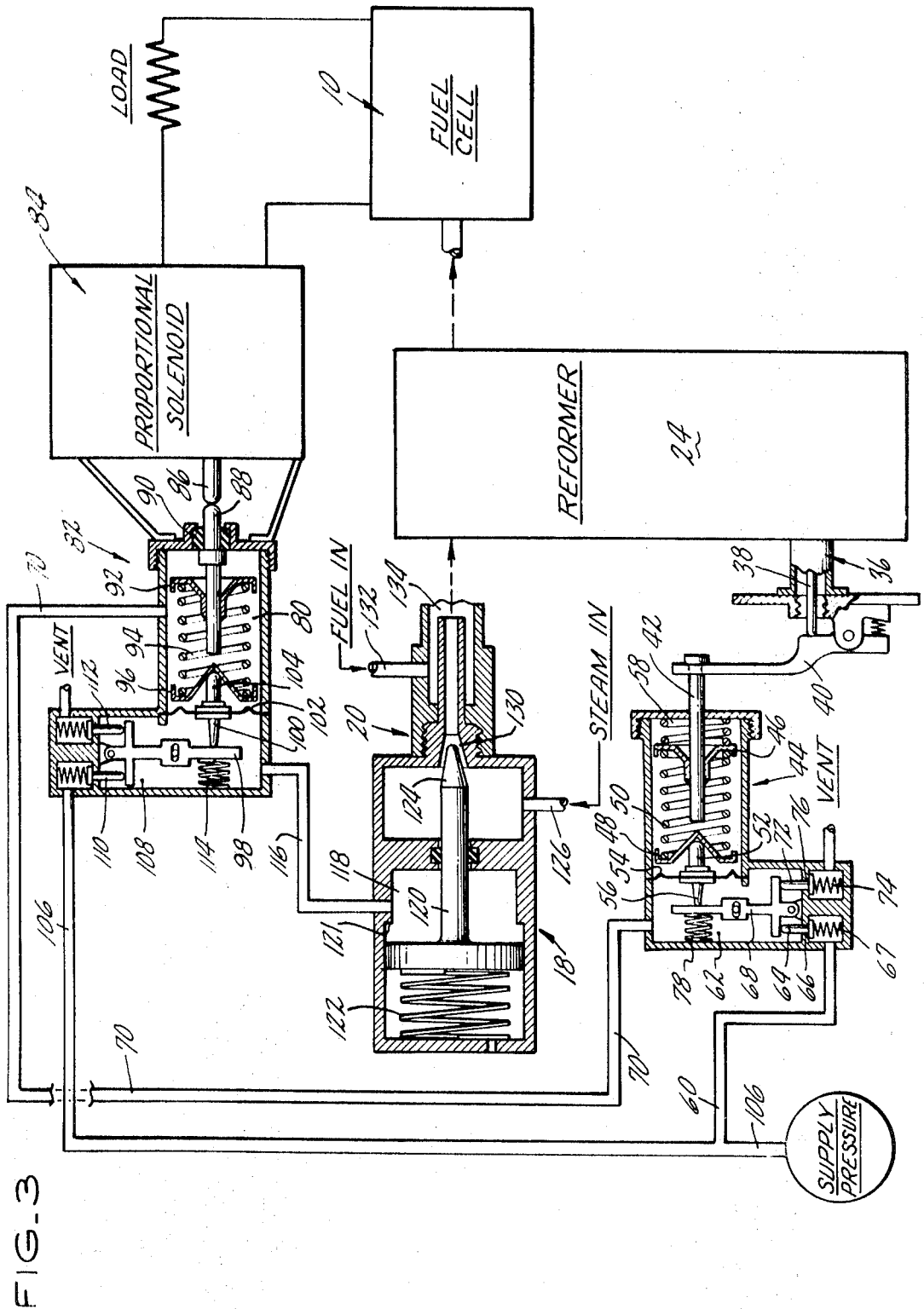
FIG. 3 is a schematic view of an apparatus designed to regulate flow as a function of gross current and reactor temperature.

Referring to FIG. 1, a fuel cell system utilizing a natural gas fuel is shown embodying the features of the present invention. The fuel cell 10 has output leads 12 through which electrons generated in the fuel cell are made available to the external load 14. A water supply is converted to steam in boiler 16 and ducted through a meter 18 to an ejector 20 where steam is the ejector primary flow. Natural gas fuel is drawn through conduit 22 and mixed with the steam supply in ejector 20. The mixture is ducted to the reformer 24 where the natural gas fuel is steam reformed to its individual constituents of hydrogen, carbon dioxide, carbon monoxide and certain residual water and methane. The steam-reformed fuel is ducted to the fuel electrode chamber of the fuel cell 10. A separator or intermediate chemical reaction may be added to purify the fuel supply.

Generally, more fuel is circulated through the cell than will be utilized in the fuel cell, and the excess of the circulated fuel is discharged from the cell and ducted to a burner 26 attached to the reformer 24 where the fuel effluent is mixed with air supplied through conduit 28. This mixture is combusted in the burner 26 for the purpose of supplying heat for the reforming reaction. The burner exhaust gases are ducted to the heat exchanger 30 adjacent to the boiler 16 for the purpose of utilizing the waste heat to provide the heat needed to boil the water supply.

Initially, the cell has a certain very limited capacity for generating current. In operation, the fuel cell is a demand system and the reformer must replenish the fuel supply at the fuel electrode. Fuel is supplied to the fuel cell and the excess is ducted to the burner in the reformer. If the supply is below that required by the fuel cell and the reformer, an insufficient amount of fuel effluent will be rejected by the cell and burned in the reformer, thereby causing the reformer temperature to decrease. On the other hand, if the excess fuel is too great, the burner temperature increases.

The system is shown as having a flow control computer 32 which responds to a gross current signal from sensor 34. In addition, the computer is shown as responding to a representative reformer temperature as signaled to the computer from pickup 36. The computer 32 incorporates the signals from the gross current sensor and the temperature pickup and transmits a signal to the meter 18. The meter 18 controls the steam flow which is the primary flow through the ejector 20. As steam flow increases, the natural gas supply increases. The computer 32 biases the reformer feed flow depending upon reformer temperature. The reformer feed flow, being a mixture of steam and natural gas, is scheduled to increase with gross current as shown in FIG. 2. This figure presents the basic description of the gross current and reformer temperature control mode. Lines $T_1$, $T_2$, $T_3$, $T_4$, and $T_5$ represent gross current and reformer feed control lines, where each line is biased to a different reformer operating temperature. At a given fuel cell current, reformer feed flow is increased by decreased reformer temperature. The range of temperatures from $T_1$ to $T_5$ are all acceptable for reformer operation. For example, $T_1$ may equal 1500° F.; $T_5$ may equal 1400° F. The reformer may operate anywhere within this range of temperatures.

Line A–C represents a typical reformer operating characteristic. A given feed flow will support a given fuel cell current. Current is directly related to hydrogen consumption since the reaction of each hydrogen molecule releases a fixed number of electrons. Therefore, line A–C is representative of the fuel cell hydrogen consumption versus the reformer feed flow, which is an operating characteristic of the reformer unit.

Operation on the right side of line A–C represents an excess of reformer feed flow resulting in a rise in reactor temperature. Conversely, operation to the left of line A–C represents an insufficient feed flow causing a drop in reactor temperature. A rise in reactor temperature causes, through the control, a decrease in feed flow. A drop in reactor temperature causes, through the control, an increase in feed flow. A balance is achieved when reformer feed flow intersects the reformer operating characteristic line. At this point, the temperature is constant.

Line C to D represents an idle to design power change in fuel cell current. The reformer is operating initially at C. A sudden change in current brings the feed flow to point D. Line D to A represents the reformer bias control responding to the over feed condition and rising temperature condition of D. As temperature rises, the control reduces feed flow, thereby reducing the rate of temperature rise until the feed flow stabilizes at point A which is the balance point on the reformer operating characteristic line. Line A to B is a design current to idle current change. Point B represents a feed flow below the required value at point C which results in a decrease in reformer temperature. The control increases feed flow until the temperature stabilizes which corresponds to balance point C on the reformer operating characteristic line. Summarizing, at a given gross current, the system is designed so that as reformer temperature decreases, the feed flow will increase to provide a greater excess of fuel not utilized in the fuel cell to be rejected and combusted in the burner to restore the reformer to the desired temperature level.

FIG. 2 also shows that rough feed flow settings are achieved through monitoring the gross current. The second function of biasing the feed flow occurs dependent upon the reformer temperature. It is apparent that for large changes in gross current, large changes in reformer feed flow occur. The amount of readjustment required of the temperature bias is a function of the shape of the reformer operating characteristic line and the accuracy of the gross current control. In fact, it has been demonstrated that reformer feed can be controlled over its full operating range by temperature bias alone, although with less response than can be achieved with gross current. The combination of gross current and temperature control provides both response and the positioning accuracy achieved with temperature biasing. Analytically, it can be shown that control with reactor temperature leads to a very tight control over the fuel cell system hydrogen utilization. This has been demonstrated in actual tests. Preferably, a response rate of one second or less for any fuel cell current change and a response rate of seven seconds or less for the temperature bias portion of the control provides the response and accuracy needed for successful steady state and transient operation.

A specific control system for regulating the reformer feed flow in accordance with the present invention is shown in FIG. 3. The control system is shown as being integrated with the fuel cell 10, the reformer 24, the meter 18, and the ejector 20. The reformer temperature pickup 36 contains a pin 38 that is coupled to the hot end of the temperature pickup. As temperature increases, the temperature pickup is designed to cause pin 38 to move further into the reformer, resulting in a clockwise rotation of link 40. This clockwise rotation imparts a force to the valve shaft 42 of the temperature pilot valve 44. The valve shaft 42 is connected to the upper seat 46 and to the lower seat 48 through the spring 50. The lower seat 48 is attached to connector 52 which engages diaphragm 54 and the diaphragm extension 56. Upper spring 58 provides a preload to the spring 50 to assure a set pressure at the valve exit. A supply pressure is provided through conduit 60 to the valve pressure chamber 62 past plunger 64. The plunger 64 normally rests against seat 66 to prevent leakage. When the plunger 64 is depressed against retaining spring 67 by rotation of the pivot bar 68, supply pressure enters chamber 62 and is ducted from the chamber through the bias pressure line 70. However, as pressure increases in the chamber, the pressure acts against the diaphgram 54 allowing the pivot bar 68 to rotate to its normal clockwise location and seating plunger 64. Counterclockwise rotation of the pivot bar 68 past the null position causes plunger 72 to be depressed against spring 74 away from seat 76 thus venting the pressure from chamber 62.

In operation, arm 40 rotates clockwise with increasing reformer temperature, thereby adjusting the force balance in the valve 44. Pivot bar 68 is forced to rotate by backup spring 78 and plunger 72 is unseated to vent chamber 62. As pressure decreases, the load on diaphragm 54 decreases and the pivot bar 68 returns to its null position. Thus, the pressure in chamber 62 decreases with increasing reformer temperature. The pressure transmitted through conduit 70 to the chamber 80 in the current-operated pilot valve 82 is defined as the bias pressure. The pressure in chamber 80 as in chamber 62 increases with decreasing reformer temperature.

A commercially available solenoid 84 provides a stroke that is proportional to the gross current and replaces sensor 34. The stroke is provided to the current-operated valve 82 through the interaction of solenoid shaft 86 with the valve shaft 88. Between the shaft 88 and the housing is a seal 90 so that the bias pressure supplied to the chamber 80 is contained within the housing. This valve is similar to the temperature-operated pilot valve 44 except for the addition of the seal 90 on the valve shaft and the elimination of the preload spring over the upper seat 92. As the shaft 88 moves responsive to changes in gross current, a force is transmitted from the upper spring seat 92 through the spring 94 to the lower spring seat 96. Thereafter, the force is felt by the pivot bar 98 by virtue of the connection with the diaphragm extension 100, the diaphragm 102, the connector 104, and the lower spring seat 96. The current operated valve supply pressure may be obtained from the same source as that for the temperature valve and is provided through conduit 106 to the pressure chamber 108 past the plunger 110. The operation of the plunger 110 and the vent plunger 112 depending on the rotation of the pivot bar 98 is identical to that described for the temperature pilot valve. A backup spring 114 counteracts the forces applied to the pivot bar 98.

As gross current increases, the increased signal in the proportional solenoid causes shaft 86 to move to the left, thereby adjusting the force balance in the valve and causing the pivot bar 98 to rotate clockwise. Plunger 110 is unseated and supply pressure enter the chamber 108. As the pressure in chamber 108 increases, the pressure force on diaphragm 102 increases to offset the force generated by the increased current signal and the pivot bar 98 returns to its null position. The pressure in the chamber 108 increases in proportion to the current and is transmitted through conduit 116 and is defined as the positioner pressure supplied to the ejector. The biasing pressure is contained within chamber 80 of the current-operated pilot valve to impart an independent force on the diaphragm 102 which is carried through to the pivot bar 98. To compensate for his force, the pivot bar rotates to allow either venting the pressure chamber or opening the supply pressure line to permit an increase in pressure to enter the compartment thereby compensating for the bias pressure force changes by adjusting the pressure forces on the diaphragm 102.

The performance interaction of the temperature pilot valve 44 and the current operated valve 82 is shown in FIG. 5. The positioner pressure transmitted through conduit 116 is shown as the abscissa of the curve. For a given fuel cell gross current, an increase in reactor temperature will schedule a decreased signal pressure.

The positioner pressure is fed through conduit 116 to cavity 118 in the meter 18. For simplicity, a servo-positioner with position feedback has been replaced with meter 18. As pressure increases, the positioner 120 moves to the left away from stop 121 against spring 122. The location of the end of the positioner, plug 124, will depend upon the positioner pressure. As plug 124 moves with increasing positioner pressure, it is evident that the steam supply from the boiler 16 which enters through conduit 126 into cavity 128 will find an increased annulus opening between the plug and the seat 130. The steam flow is through the primary nozzle of the ejector. Fuel is pumped in through port 132 and is the secondary flow through the variable area ejector. The two streams mix in the nozzle cavity 134 and thereafter are ducted to the reformer 24 where the fuel is steam reformed in the presence of a catalyst to its constituents. FIG. 4 graphically presents the steam flow through the variable area ejector as a function of the positioner pressure. The steam flow and the fuel flow are equated to the feed flow in FIG. 2.

Although the invention has been shown and described with respect to a preferred embodiment, it should be understood by those skilled in the art that various changes and omissions in the form and detail may be made therein without departing from the spirit and the scope of the invention.

What is claimed is:

1. In a fuel cell system having a fuel cell and a reformer including a burner, the method of regulating the reformer feed flow comprising:
   mixing fuel with steam;
   supplying said mixture of fuel and steam to the reformer;
   steam reforming said mixture;
   conveying said steam reformed mixture to the fuel cell;
   sensing the fuel cell gross current output and the reformer operating temperature;
   conveying the fuel effluent from the fuel cell to the burner in the reformer;
   mixing the fuel effluent with air;
   combusting the mixture of the effluent and air to supply heat for reforming said mixture of fuel and steam;
   controlling the feed flow as a function of fuel cell gross current;
   biasing the feed flow as a function of reformer operating temperature; and
   matching the response rates of the gross current control and the reformer temperature bias to regulate fuel utilization.

2. The method of claim 1, including:
   providing a rapid response rate of approximately one second or less in the gross current control; and
   providing a gradual response rate of approximately seven seconds or less in the temperature bias portion of the control.

3. In a natural gas fuel cell system having a fuel cell and a low pressure reformer including a burner, the method of regulating the fuel consumption requirements of the fuel cell comprising:
   mixing fuel with steam;
   supplying said mixture of fuel and steam to the reformer;
   steam reforming said mixture;
   conveying said steam reformed mixture to the fuel cell;
   sensing the fuel cell gross current and the reformer operating temperature;
   conveying the fuel effluent from the fuel cell to the burner in the reformer;
   mixing the fuel effluent with air;
   combusting the mixture of fuel effluent and air to supply heat for reforming said mixture of fuel and steam;
   providing fuel flow settings rapidly as a function of the gross current; and
   providing trim of the fuel flow settings gradually as a function of the reformer operating temperature.

4. The method of claim 3, including:
   providing a response time less than one second for the gross current control and less than seven seconds for the reformer temperature control.

5. In a fuel cell powerplant having a fuel cell and a reformer including a burner, the method of regulating the feed flow to the reformer comprising:
   mixing fuel with steam;

supplying said mixture of fuel and steam to the reformer;
steam reforming said mixture;
conveying said steam reformed mixture to the fuel cell;
sensing the fuel cell gross current and the reformer temperature;
conveying the fuel effluent from the fuel cell to the burner in the reformer;
mixing the fuel effluent with air;
combusting the mixture of fuel effluent and air to supply heat for reforming said mixture of fuel and steam;
controlling the steam flow to the reformer as a function of the gross current;
biasing the steam flow to the reformer gradually as a function of the reformer temperature; and
matching the steam flow with a desired fuel flow by supplying the steam flow as the primary flow to an ejector and the fuel flow as the secondary flow to the ejector.

References Cited

UNITED STATES PATENTS

| | | | |
|---|---|---|---|
| 3,253,957 | 5/1966 | Turner et al. | 136—86 |
| 3,268,364 | 8/1966 | Cade et al. | 136—86 |
| 3,296,029 | 1/1967 | Davis | 136—86 |
| 3,146,131 | 8/1964 | Linden et al. | 136—86 |
| 3,198,664 | 8/1965 | Kunz | 136—86 |

ALLEN B. CURTIS, Primary Examiner

H. A. FEELEY, Assistant Examiner